US010339839B2

(12) United States Patent
Shanley et al.

(10) Patent No.: US 10,339,839 B2
(45) Date of Patent: *Jul. 2, 2019

(54) MULTI-LAYERED LABEL FOR A LETTER OR PACKAGE

(71) Applicant: Emerald City Label, Inc., Everett, WA (US)

(72) Inventors: Ted Shanley, Freeland, WA (US); Dan VanWaveren, Snohomish, WA (US)

(73) Assignee: Emerald City Label, Inc., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,108

(22) Filed: Mar. 23, 2018

(65) Prior Publication Data
US 2018/0211569 A1 Jul. 26, 2018

Related U.S. Application Data

(63) Continuation of application No. 15/172,858, filed on Jun. 3, 2016, now Pat. No. 9,959,788, which is a continuation-in-part of application No. 14/177,857, filed on Feb. 11, 2014, now Pat. No. 9,361,811, which is a continuation-in-part of application No. 13/048,166, filed on Mar. 15, 2011, now abandoned.

(60) Provisional application No. 61/317,363, filed on Mar. 25, 2010.

(51) Int. Cl.
| | | |
|---|---|---|
| B42D 15/00 | (2006.01) |
| B65D 75/58 | (2006.01) |
| G09F 3/00 | (2006.01) |
| G09F 3/10 | (2006.01) |
| B32B 7/06 | (2019.01) |
| B32B 7/12 | (2006.01) |
| B32B 3/26 | (2006.01) |
| G09F 3/02 | (2006.01) |
| B65D 75/66 | (2006.01) |

(52) U.S. Cl.
CPC ............ *G09F 3/0289* (2013.01); *B32B 3/266* (2013.01); *B32B 7/06* (2013.01); *B32B 7/12* (2013.01); *B42D 15/006* (2013.01); *G09F 3/10* (2013.01); *B32B 2519/00* (2013.01); *B65D 75/5805* (2013.01); *B65D 75/5888* (2013.01); *B65D 75/66* (2013.01); *G09F 2003/0257* (2013.01); *Y10T 428/15* (2015.01)

(58) Field of Classification Search
CPC ............ B65D 75/5805; B65D 75/5815; B65D 75/5888; B65D 75/66; B42D 15/006
USPC ............................... 283/56, 81; 428/42.2, 43
See application file for complete search history.

(56) References Cited

U.S. PATENT DOCUMENTS

| | | |
|---|---|---|
| 4,033,611 A | 7/1977 | Johnsen |
| 5,071,167 A | 12/1991 | O'Brien |
| 5,509,694 A | 4/1996 | Laurash et al. |
| 5,659,987 A | 8/1997 | Scheggetman |
| 5,730,469 A | 3/1998 | Heimerdinger et al. |
| 5,908,246 A | 6/1999 | Arimura et al. |
| 6,244,629 B1 | 6/2001 | Chess |

(Continued)

OTHER PUBLICATIONS

"U.S. Appl. No. 13/048,166, Examiner Interview Summary dated Jun. 12, 2013", 4 pgs.

(Continued)

*Primary Examiner* — Kyle R Grabowski
(74) *Attorney, Agent, or Firm* — Schwegman Lundberg & Woessner, P.A.

(57) ABSTRACT

A label includes a first section and a second section that is attached to the first section. The first section includes a panel. The panel includes one or more sides that are detachable from the first section.

19 Claims, 14 Drawing Sheets

(56) References Cited

U.S. PATENT DOCUMENTS

| | | |
|---|---|---|
| 6,589,623 B2 | 7/2003 | Roth |
| 8,545,099 B2 | 10/2013 | Davis et al. |
| 9,361,811 B2 | 6/2016 | Shanley et al. |
| 2002/0101074 A1 | 8/2002 | Marchetti |
| 2002/0113428 A1 | 8/2002 | Phillips et al. |
| 2011/0233920 A1 | 9/2011 | Shanley et al. |
| 2013/0093178 A1 | 4/2013 | Shanley et al. |
| 2014/0157638 A1 | 6/2014 | Shanley et al. |
| 2016/0284247 A1 | 9/2016 | Shanley et al. |

OTHER PUBLICATIONS

"U.S. Appl. No. 13/048,166, Final Office Action dated Aug. 13, 2013", 9 pgs.

"U.S. Appl. No. 13/048,166, Non Final Office Action dated Dec. 6, 2012", 10 pgs.

"U.S. Appl. No. 13/048,166, Response filed Jun. 5, 2013 to Non-Final Office Action dated Dec. 6, 2012", 11 pgs.

"U.S. Appl. No. 13/706,702, Non Final Office Action dated Apr. 23, 2014", 10 pgs.

"U.S. Appl. No. 14/177,857, Notice of Allowance dated Apr. 27, 2016", 7 pgs.

"U.S. Appl. No. 14/177,857, Response filed Apr. 7, 2016 to Non-Final Office Action dated Dec. 15, 2015", 10 pgs.

"U.S. Appl. No. 15/172,858, Corrected Notice of Allowance dated Mar. 13, 2018", 2 pgs.

"U.S. Appl. No. 15/172,858, Notice of Allowance dated Feb. 28, 2018", 9 pgs.

"U.S. Appl. No. 15/172,858, Preliminary Amendment filed Jun. 6, 2016", 11 pgs.

"U.S. Appl. No. 14/177,857, Non-Final Office Action dated Dec. 15, 2015", 9 pgs.

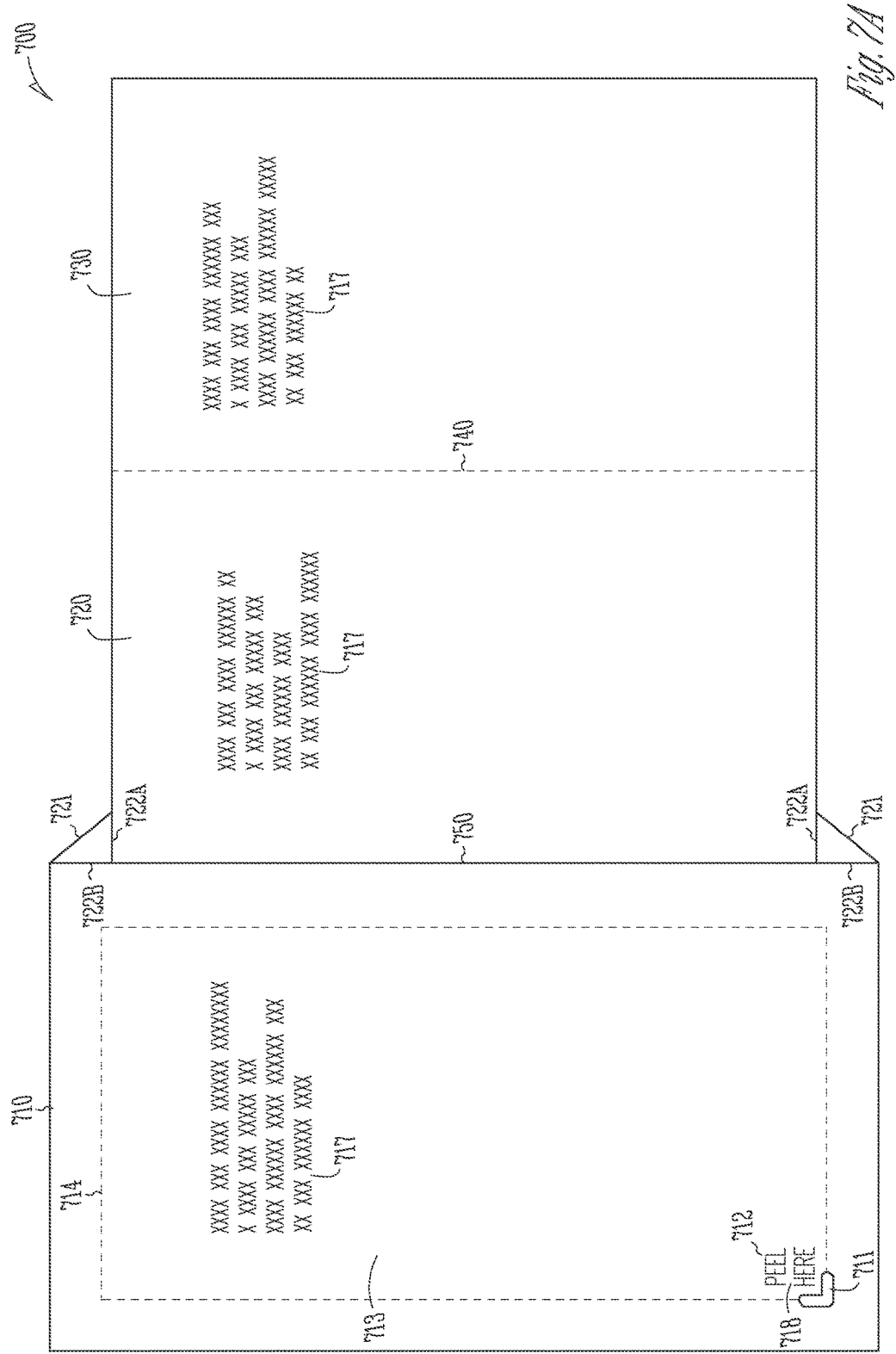

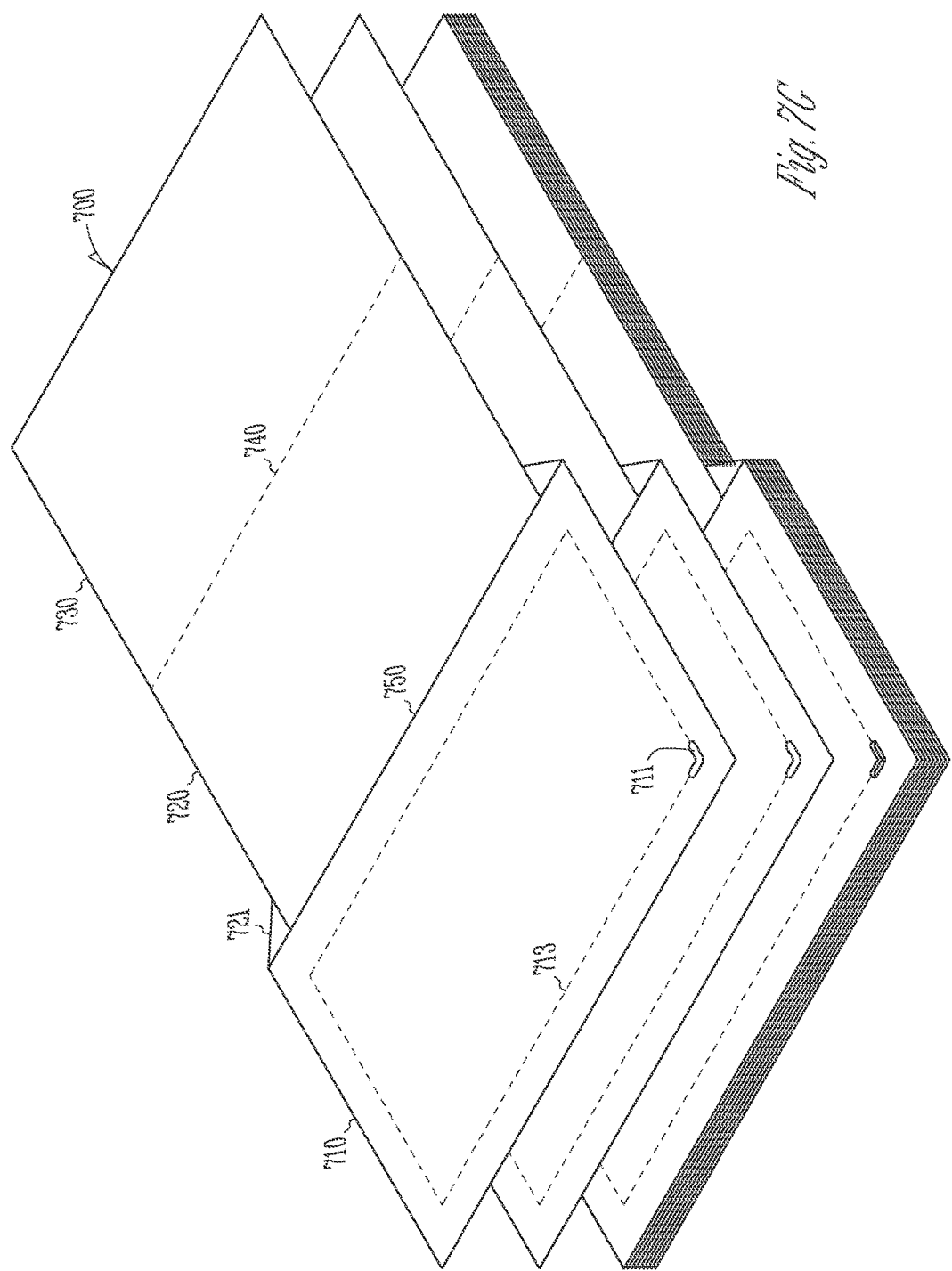

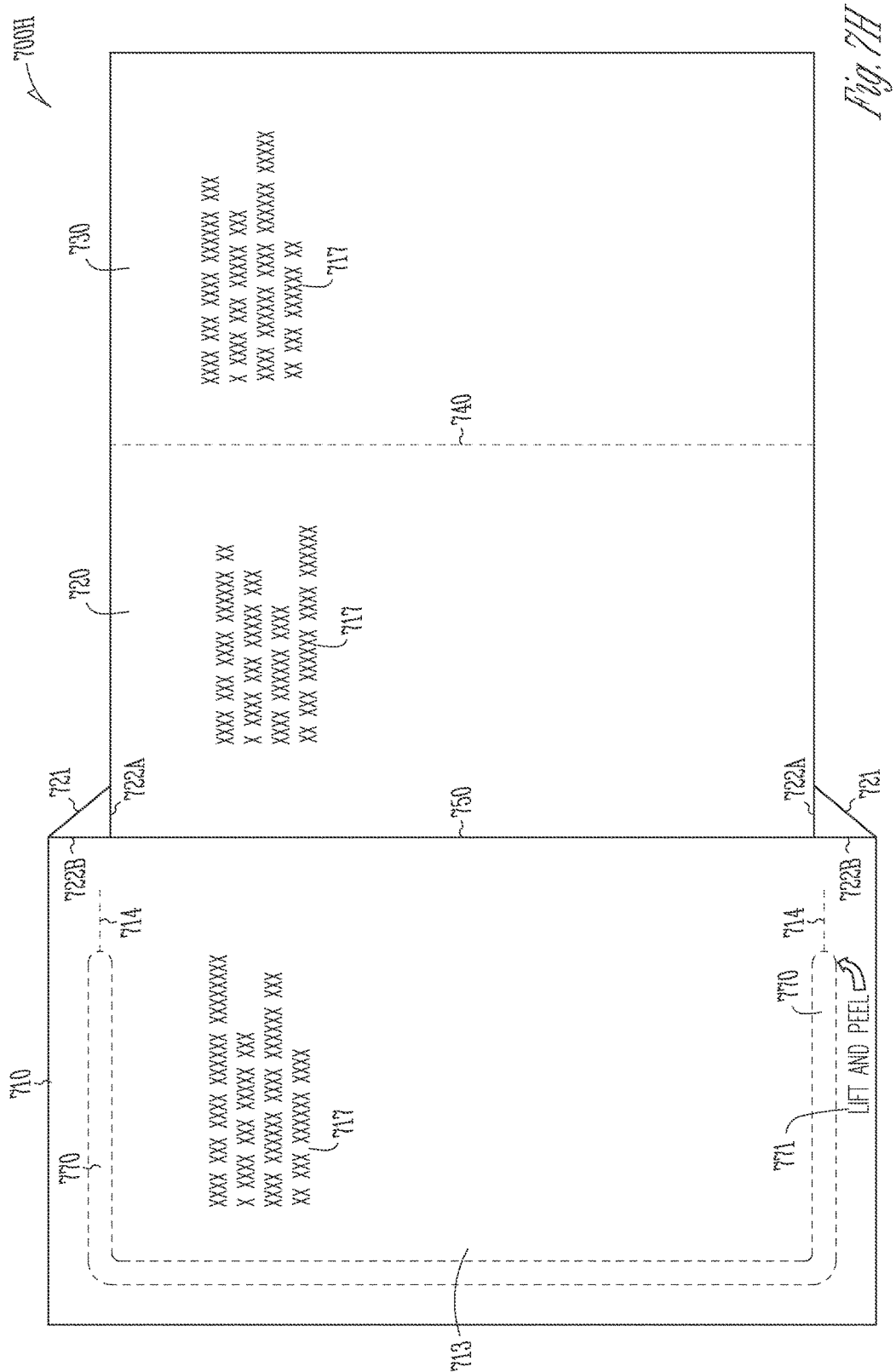

MULTI-LAYERED LABEL FOR A LETTER OR PACKAGE

This application is a continuation of and claims priority under 35 U.S.C. 120 to U.S. application Ser. No. 15/172,858, which was filed on Jun. 3, 2016 and is a continuation-in-part and claims priority under 35 U.S.C. 120 to U.S. application Ser. No. 14/177,857, which was filed on Feb. 11, 2014, which is a continuation-in-part of and claims priority under 35 U.S.C. 120 to U.S. application Ser. No. 13/048,166, which was filed on Mar. 15, 2011, which claims the benefit of priority under 35 U.S.C. 119(e) to U.S. Provisional Patent Application Ser. No. 61/317,363, filed on Mar. 25, 2010, which applications are incorporated herein by reference in their entirety.

BACKGROUND

Labels are generally applied to letters and packages for a variety of purposes. For example, the label may include information about the contents of a letter or package, or it may include information about an addressee of the letter or the package.

BRIEF DESCRIPTION OF THE FIGURES

FIG. 7A is a top view of a multi-layered label, according to various embodiments.

FIG. 7E is a side view of the multilayer label of FIG. 7A, according to various embodiments.

FIG. 7G is a perspective view of a plurality of multilayer labels.

FIG. 7I is a top view of the multilayer label of FIG. 7H as applied to a letter, package, or container, according to various embodiments.

DETAILED DESCRIPTION

In the following description, reference may be made to the accompanying drawings that form a portion of the present disclosure, and show by way of illustration, various embodiments that may be practiced. Although the various embodiments are described in sufficient detail to permit those skilled in the art to practice the various embodiments, still other embodiments may be possible through various structural changes without departing from the scope of the present disclosure.

Figure 1:
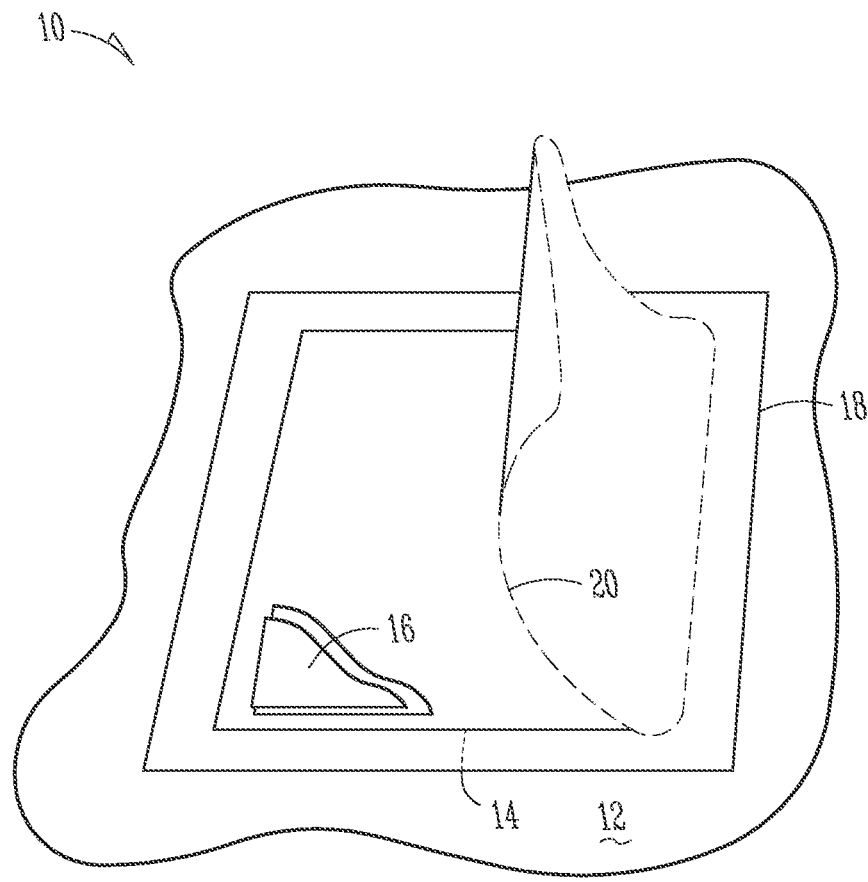
FIG. 1 is a diagrammatic view of a multi-layered label, according to the various embodiments.

FIG. 1 is a diagrammatic view of a multi-layer label 10, according to the various embodiments. The label 10 may be configured to be positioned on a surface 12 of a letter, a package or parcel, or other similar articles. The label 10 may be configured to be adhesively attached to the surface 12. Accordingly, the label 10 may include an adhesive material 14 that is concealed by a backing material (not shown in FIG. 1) that may be removed to expose the adhesive material 14 prior to affixing the label 10 to the surface 12. The adhesive material 14 may be activated by the introduction of moisture to the adhesive material 14 (e.g., a gummed backing) Alternatively, the adhesive material 14 may be applied to the label 10 by brushing, spraying, or rolling a suitable adhesive onto the label 10, or onto the surface 12 prior to positioning the label 10 onto the surface 12. The label 10 may also include one or more panels 16 that may be concealed beneath an external panel 18. The external panel 18 may also include a detachable panel 20 that may be configured to be at least partially separable from the external panel 18, so that the one or more panels 16 may be exposed after the label 10 is applied to the surface 12. The one or more panels 16, the external panel 18 and the detachable panel 20 will be discussed in greater detail below.

Figure 2:
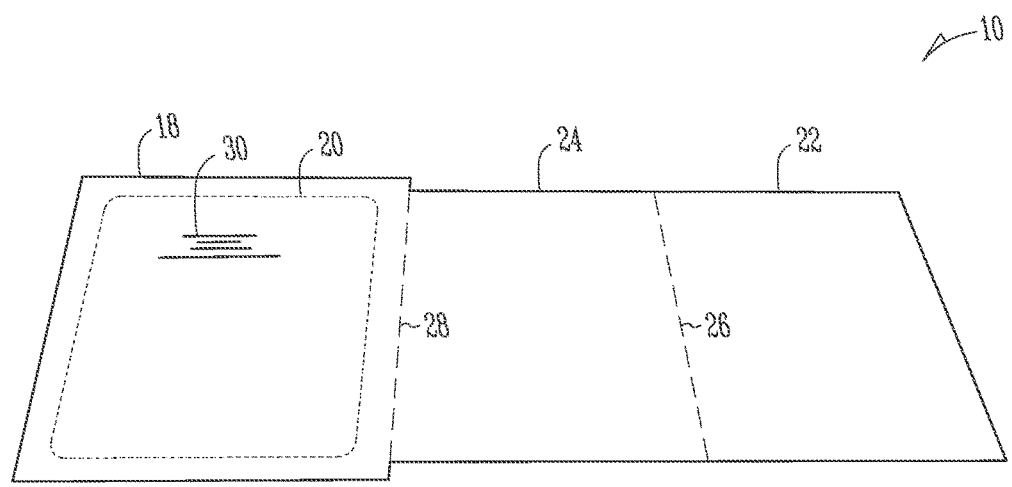
FIG. 2 is another diagrammatic view of the multi-layered label of FIG. 1, according to the various embodiments.

FIG. 2 is another diagrammatic view of the label 10 of FIG. 1, according to the various embodiments. The label 10 may include a first panel 22 and a second panel 24 hingeably attached to the first panel 22 by a fold line 26. The second panel 24 may be further attached to the external panel 18 by a scored line 28. The scored line 28 will be discussed in detail below. The first panel 22 and the second panel 24 may be configured to include various written and/or graphical representations, including promotional information for various commercial products and/or services, and may be further configured to include a personalized message. In accordance with an embodiment, at least a portion of the first panel 22 may include a personalized message that may be directly viewed when the detachable panel 20 is at least partially removed from the external panel 18. In accordance with another embodiment, the first panel 22 may be omitted, so that only a single panel (e.g., the second panel 24) may be concealed by the external panel 18.

Still referring to FIG. 2, the detachable panel 20 of the external panel 18 may also be configured to include various written and/or graphical information 30. For example, the written and/or graphical information 30 may include an identification of an addressor (e.g., a shipper, or a sender), an addressee (e.g., a recipient), or other pertinent information, such as information provided by a carrier that handles the shipping of the item attached to the label 10. The written and/or graphical information 30 may therefore include written (e.g., plain language) information and it may also include coded information in various forms, such as one-dimensional or two-dimensional bar code information, for example.

Figure 3:
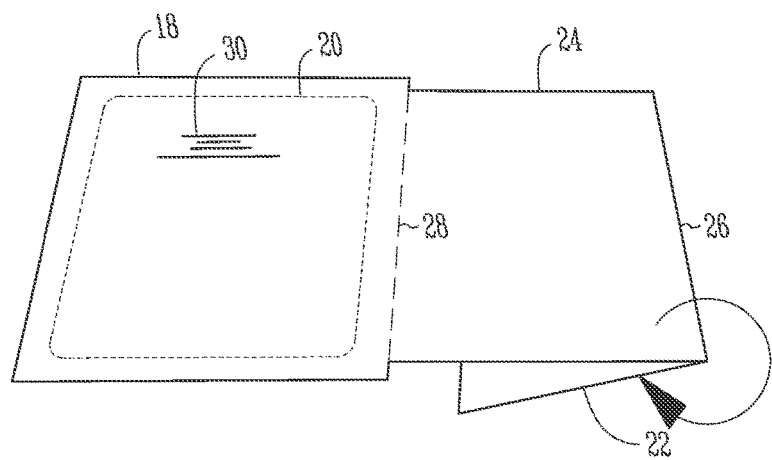
FIG. 3 is still another diagrammatic view of the multi-layered label of FIG. 1, according to the various embodiments.
Figure 4:
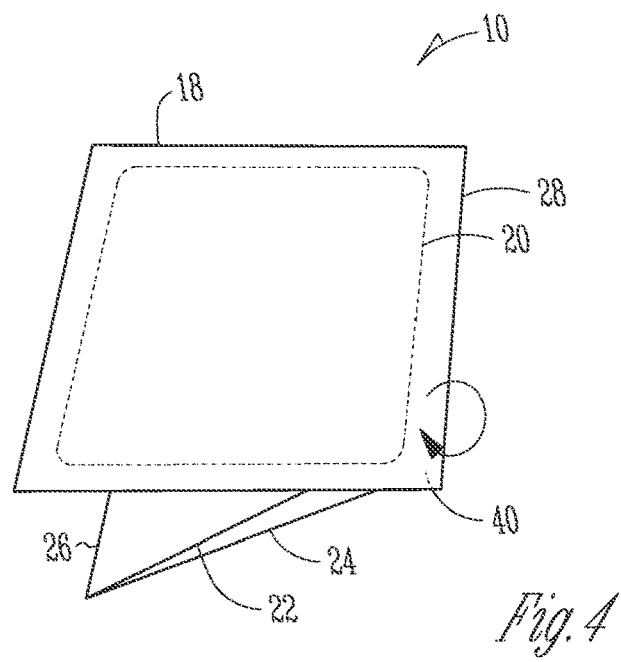
FIG. 4 is still another diagrammatic view of the multi-layered label of FIG. 1, according to the various embodiments.

Referring now to FIG. 3, and prior to attaching the label 10 to the surface 12 (as shown in FIG. 1), the first panel 22 of the label 10 may be configured to be rotated about the fold line 26 and towards an underside of the second panel 24. Turning now to FIG. 4, the first panel 22 and the second panel 24 may be rotated in unison, as shown, to abut an underside of the detachable panel 20. The first panel 22 and the second panel 24 may be substantially aligned with the detachable panel 20 following the rotation shown in FIG. 4. As the first panel 22 and the second panel 24 are rotated, a first adhesive portion 40 of the adhesive material 14 (on the underside of panel 18 as illustrated in FIG. 4) may be exposed by the removal of the backing material from the adhesive material 14.

Figure 5:
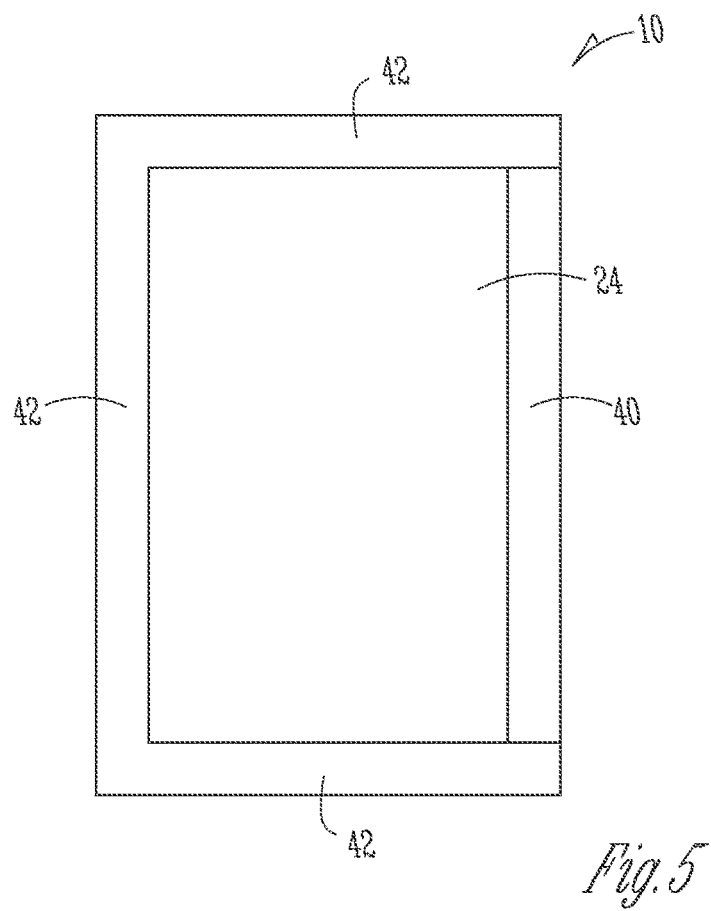
FIG. 5 is a plan view of an underside of the multi-layered label, according to the various embodiments.

FIG. 5 is a plan view of an underside of the label 10, according to the various embodiments. Since the first panel 22 and the second panel 24 are rotated to an underside of the label 10, as discussed in connection with FIG. 4, the first adhesive portion 40 is exposed and is prepared to be applied to the surface 12 (as shown in FIG. 1). Prior to application of the label 10 to the surface, a second adhesive portion 42 may be exposed by removal of a backing material 62 (see FIG. 6) from the underside of the label 10, whereupon the label 10 may be adhesively attached to the surface 12.

Figure 6:
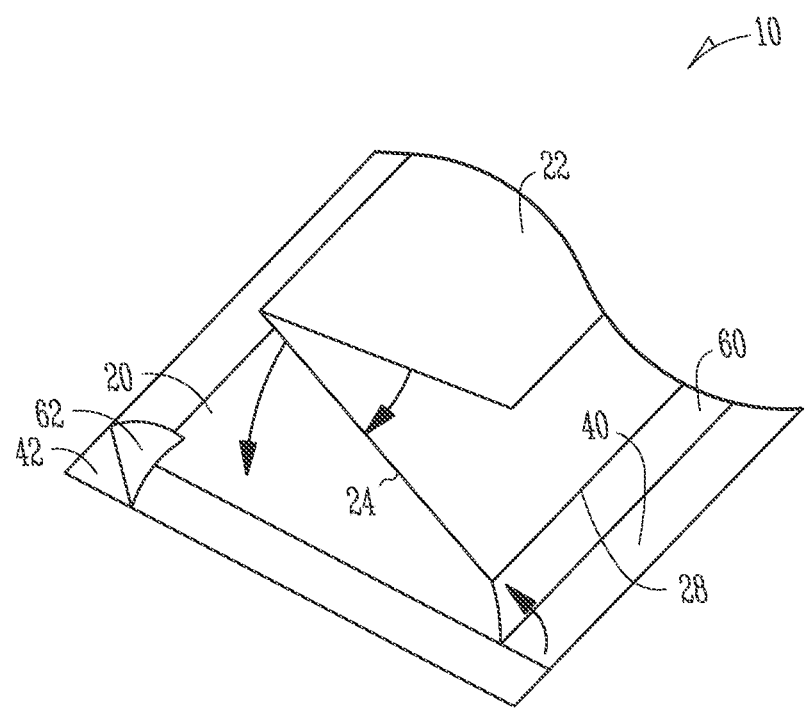
FIG. 6 is a partial isometric view of the underside of the multi-layered label, according to the various embodiments.

With reference now to FIG. 6, a partial isometric view of the underside of the label 10 is shown that will be used to further describe the first adhesive portion 40, according to the various embodiments. The scored line 28 may be configured to be pulled away from the first adhesive portion 40, so that the first panel 22 and the second panel 24 remain attached to the label 10 by a backing material 60 as the first panel 22 and the second panel 24 are rotated into contact with an underside of the detachable panel 20. The backing material 62 may also be removed from the second adhesive portion 42, so that the first adhesive portion 40 and the second adhesive portion 42 cooperatively adhere the label 10 to the surface 12 (as shown in FIG. 1).

Figure 7B:
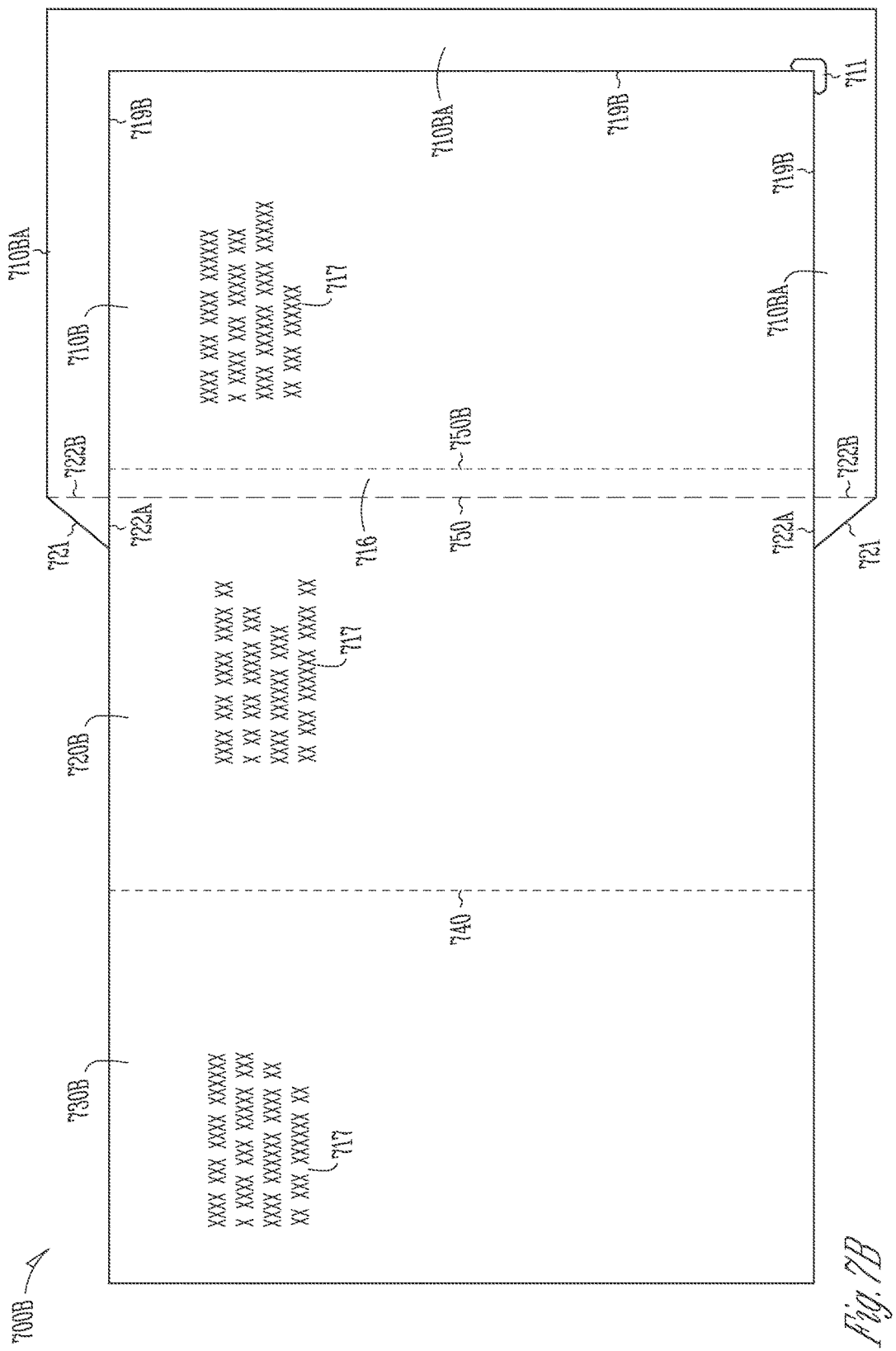
FIG. 7B is a bottom view of the multi-layered label of FIG. 7A, according to various embodiments.

FIGS. 7A-7G are additional figures further illustrating the embodiments of FIGS. 1-6. FIG. 7A illustrates a top view of a multi-layered label 700. As illustrated in FIG. 7E, the multi-layered label 700 includes a top layer 701, an adhesive layer 702, and a bottom layer 703. FIG. 7A illustrates a top view of the top layer 701. The top layer 701 and the bottom layer 703 can include text and/or graphics on the top surface and the bottom surface of the multilayer label respectively. The advantages of such text and/or graphics will be described herein.

Referring again to FIG. 7A, the multi-layered label 700 includes three panels 710, 720, and 730. Panel 710 is proximately located next to panel 720 at separation line 750. In an embodiment, panel 710 abuts and comes into contact with panel 720. In this embodiment, there are no teeth present to connect panel 710 to panel 720. Panel 720 separates from panel 710 when the multi-layered label 700 is prepared for application to a letter, package, or container by folding panels 720 and 730 under panel 710, as is described in detail herein. Panel 730 is attached to panel 720 at a perforated attachment-separation line 740. In an embodiment, the perforated attachment-separation line 740 is made up of about eight to ten teeth per inch so that panels 720 and 730 can be folded or rotated with respect to each other about attachment-separation line 740. Further, panel 730 can be separated from panel 720 by exerting a tearing force along attachment-separation line 740 to break the teeth.

The panel 710 further includes a subpanel 713, which is defined by a perforated attachment-separation line 714, which is similar in construction to perforated attachment-separation line 740. In an embodiment, perforated separation-attachment line 714 is part of the first layer 701, while the perforated separation-attachment line 740 penetrates all three layers 701, 702, and 703. Opening 711 penetrates all three layers 701, 702, and 703. The opening 711 allows one to grasp the tab 718 created by the opening (and as indicated by the "PEEL HERE" instruction 712), and pull back and separate the subpanel 713 from the panel 710, as will be explained in detail herein. Multi-layered label 700 further includes pull tabs 721, which are defined by and separated from subpanels 710 and 720 via separation lines 722A and 722B. In an embodiment, separation line 722B is similar in construction to separation line 750, while separation line 722A has no attachment to panel 720, thereby allowing pull tabs 721 to swing about separation line 722B. Pull tabs 721 are used to separate the third layer 703 from the adhesive layer 702 when the multi-layered label 700 is applied to a letter, package, or container, as described in detail herein. FIG. 7A further indicates that, as noted above, all three panels 710, 720, and 730 can include text and/or graphics 717 including product information, shipping labels and information, return labels and information, birthday and holiday greetings, etc.

FIG. 7B illustrates a bottom view 700B of the bottom layer 703 of multi-layered label 700. To arrive at FIG. 7B, the multi-layered label of FIG. 7A is turned over in a lateral fashion, such that panels 710B, 710BA, which were under panel 710 and not visible in FIG. 7A, are on the right side of FIG. 7B (with panel 710 underneath panels 710B, 710BA in FIG. 7B and not visible in FIG. 7B). Similarly, panel 730B, which was under panel 730 and not visible in FIG. 7A, is now on the left side of FIG. 7B (with panel 730 underneath panel 730B in FIG. 7B and not visible in FIG. 7B). Panel 720B remains between panels 710B and 730B (with panel 720 underneath panel 720B in FIG. 7B and not visible in FIG. 7B). Panels 710B and 710BA are separated from each other by separation line 719B, which is similar in construction to separation line 750. As will be explained in detail below, the panel 710BA of the layer 703 is removed from the adhesive layer 702 and the first layer 701 (using pull tab 721) to expose the adhesive layer 702 under the panel 710BA such that the multi-layer label 700 can be adhered to a letter, package, or container.

FIG. 7B further illustrates that perforated attachment-separation line 750B is positioned between panels 710B and 720B. As noted above, perforated attachment-separation line 740 penetrates all three layers 701, 702, and 703, and as such is illustrated in FIG. 7B as it was illustrated in FIG. 7A. In contrast however, perforated attachment-separation line 750B is not the same as or contiguous with separation line 750 of FIG. 7A. In an embodiment, as illustrated in FIG. 7B, separation line 750 (shown in phantom) and perforated attachment-separation line 750B are offset and form a strip 716 on the third layer 703 that exposes a portion of the adhesive layer 702 when the multi-layer label is prepared for attachment to a letter, package or container, as explained in detail below.

As noted in the discussion above relating to FIG. 7A, opening 711 penetrates all three layers 701, 702, and 703, and opening 711 is illustrated in FIG. 7B. The panels 710B, 720B, and 730B of the third layer 703, like the panels 710, 720, and 730 of first layer 701, can include text and/or graphics 717. The panel 710BA normally does not include any text and/or graphics.

Pull tabs 721 are also visible in FIG. 7B, with vertical separation line 722B (shown in phantom in FIG. 7B) contiguous with subpanel 710BA of third layer 703, and horizontal separation line 722A non-contiguous and separate from subpanel 720B (so that as explained above pull tab 721 can swing about vertical tab 722B).

Figure 7C:
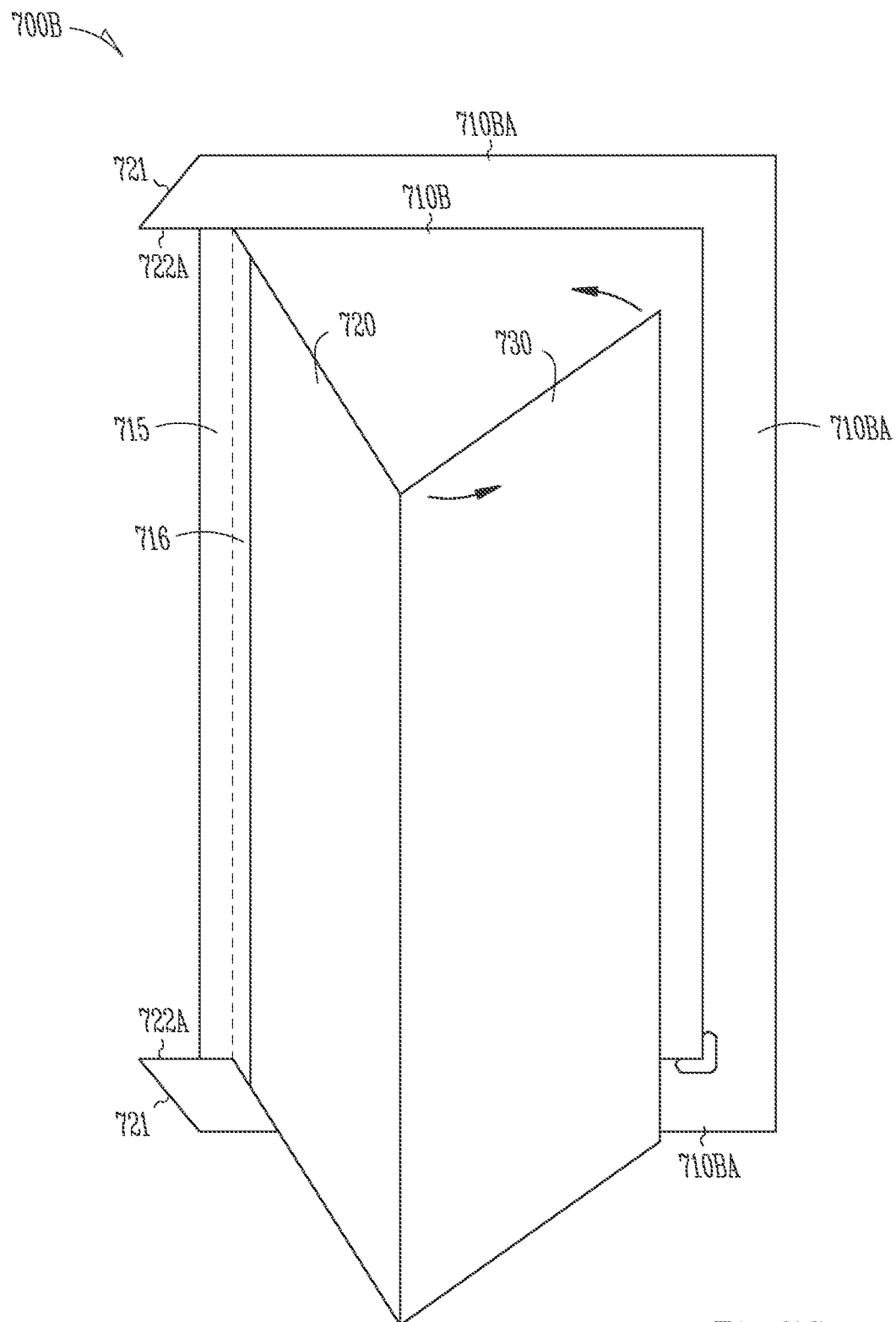
FIG. 7C is an additional view of the bottom view of FIG. 7B, and further illustrating a C-Fold of the multi-layered label, according to various embodiments.
Figure 7D:
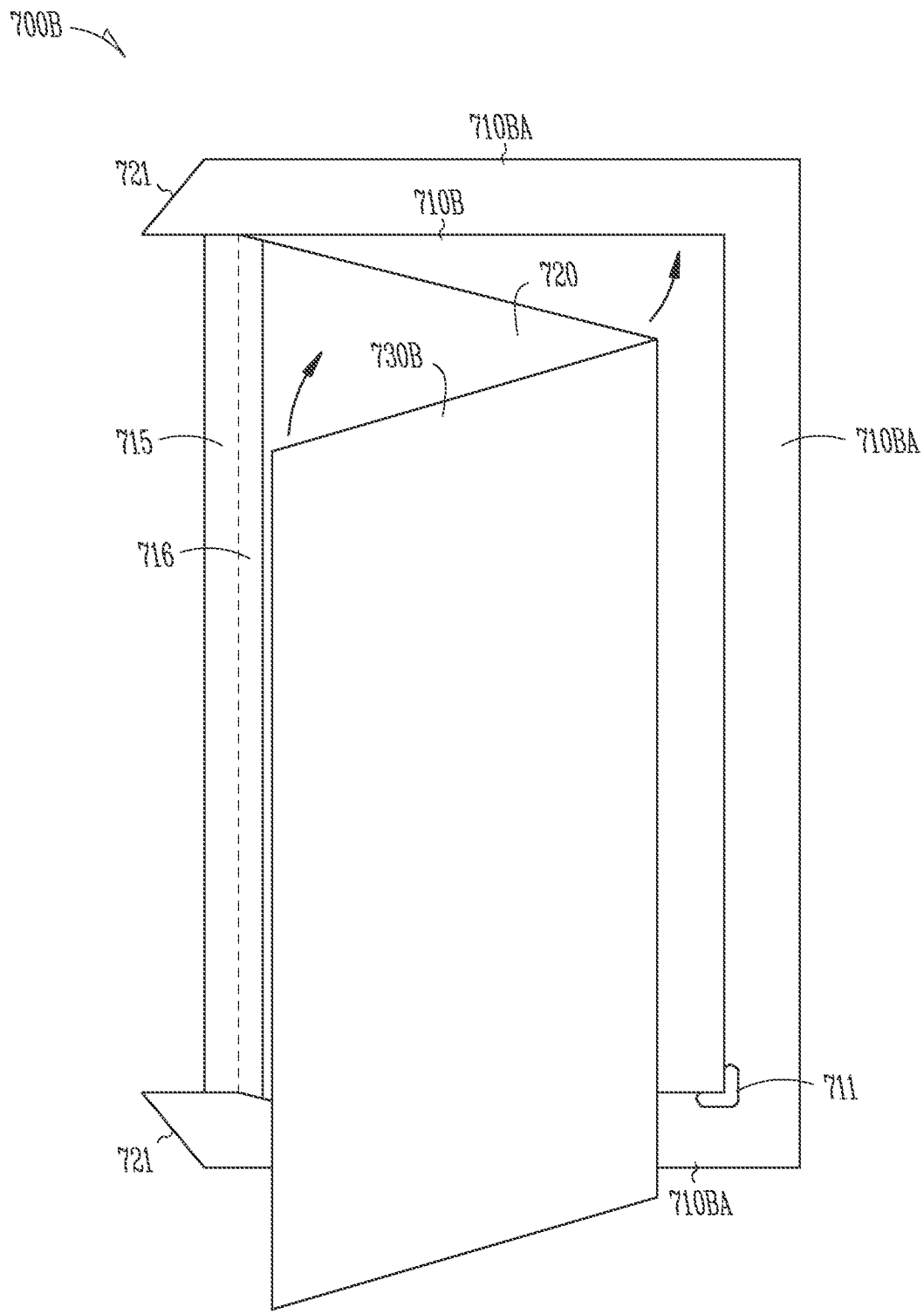
FIG. 7D is an additional view of the bottom view of FIG. 7B, and further illustrating a Z-Fold of the multi-layered label, according to various embodiments.

The multi-layer label 700 is prepared for applying, and applied to, a letter, package, or container as follows. As illustrated in FIGS. 7C and 7D, panels 720 and 730 are either C-Folded (FIG. 7C) or Z-Folded (FIG. 7D). In a C-Fold, panel 730, 730B is first folded over panel 720, 720B (with respect to bottom view in FIG. 7B), then panel 720, 720B is folded towards panel 710B such that panels 720, 720B and 730, 730B are both folded onto panel 710B (with top panel 730 coming into contact with panel 710B). In a Z-Fold, panel 720, 720 is folded onto panel 710B (such that panel 720B comes into contact with panel 710B), and panel 730, 730B is then folded on top of panel 720, 720B (once again, with respect to the bottom view in FIG. 7B). As noted, in a C-Fold, the front face (top first layer 701) of the panel 730 and its text and/or graphics abut panel 710B of the bottom layer 703, such that when subpanel 713 is removed in part or whole from panel 710, the text and/or graphics of panel 730 becomes visible. In a Z-Fold, the panel 720B and its text and/or graphics come into contact with panel 710B, such that the text and/or graphics on the panel 720B become visible when the subpanel 713 is removed from the panel 710 (See FIG. 7F). As illustrated in FIG. 7F, the Z-Fold abuts the bottom layer of panel 720B against the bottom layer 710B, with the top layer 730 underneath abutting the top layer 720, such that when the subpanel 713 is removed, the panel 720B is exposed, and when the panel 720B is removed, the panel 730 is exposed.

Still referring to FIGS. 7C and 7D, upon executing the C-Fold or the Z-Fold, panel 720 moves away from pull tabs 721 and horizontal line 722A. Further pulling on the folded over panels 720, 720B and 730, 730B causes a strip 715 of top layer 701 and middle layer 702 to be exposed (thereby exposing the adhesive of layer 702). Further exposed is the strip 716 of the bottom layer 703 which covered the adhesive on the strip 715. The multi-layered label now has both panels 720, 720B and 730, 730B located on top of the panel 710B (with respect to the view in FIG. 7B). Still referring to FIGS. 7C and 7D, the pull 721 is grasped and pulled such that the strip 710BA of the bottom layer 703 is pulled away from the adhesive of the middle layer 702, thereby removing the strip 710BA on the three sides of panel 710B. The multi-layer label now has four adhesive strips exposed—715 and the three sections labeled 710BA. With all four adhesive layers (715 and the three sections of 710BA) exposed, the multi-layer label 700 can be applied to a letter, package, or container as illustrated in FIG. 7F. In FIG. 7F, the top side of panel 710 is visible on the letter, package, or container, and the panels 720, 720B and 730, 730B are under the panel 710 and contained within a compartment formed by the adhesion of strips 715 and the three sections of 710BA to the letter, package, or container.

Figure 7H:
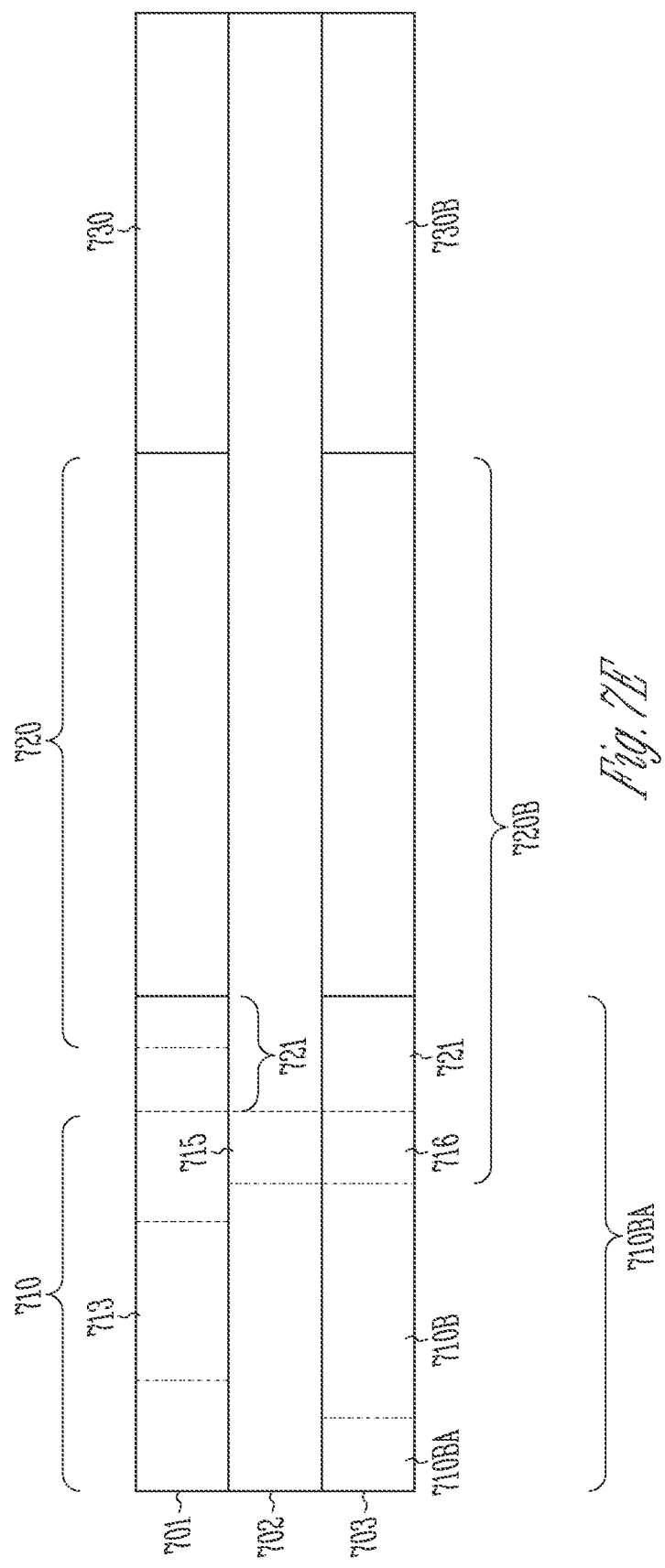
FIG. 7H is a top view of a multi-layered label, according to various embodiments.
Figure 7F:
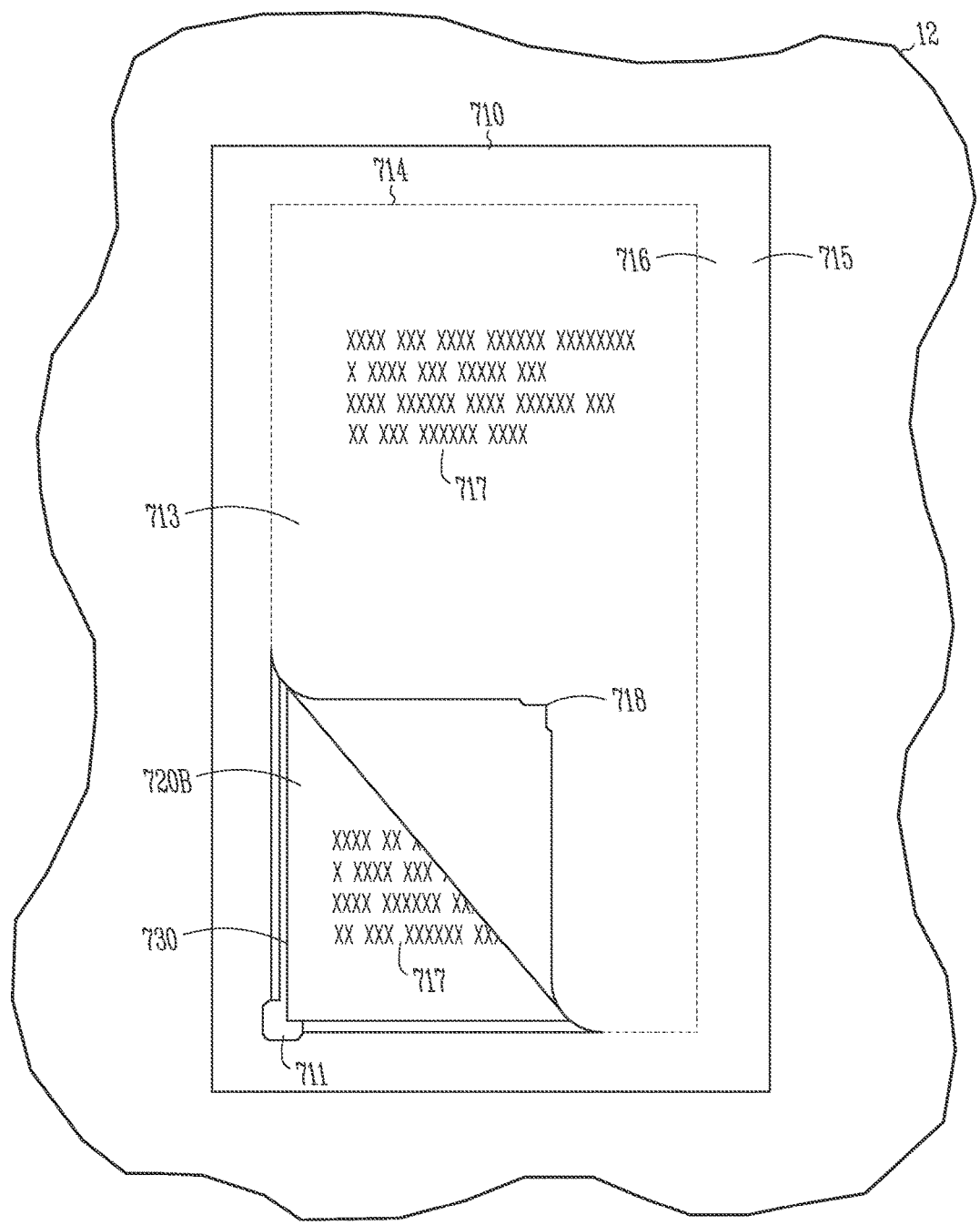
FIG. 7F is a top view of the multilayer label of FIG. 7A as applied to a letter, package, or container, according to various embodiments.
Figure 71:
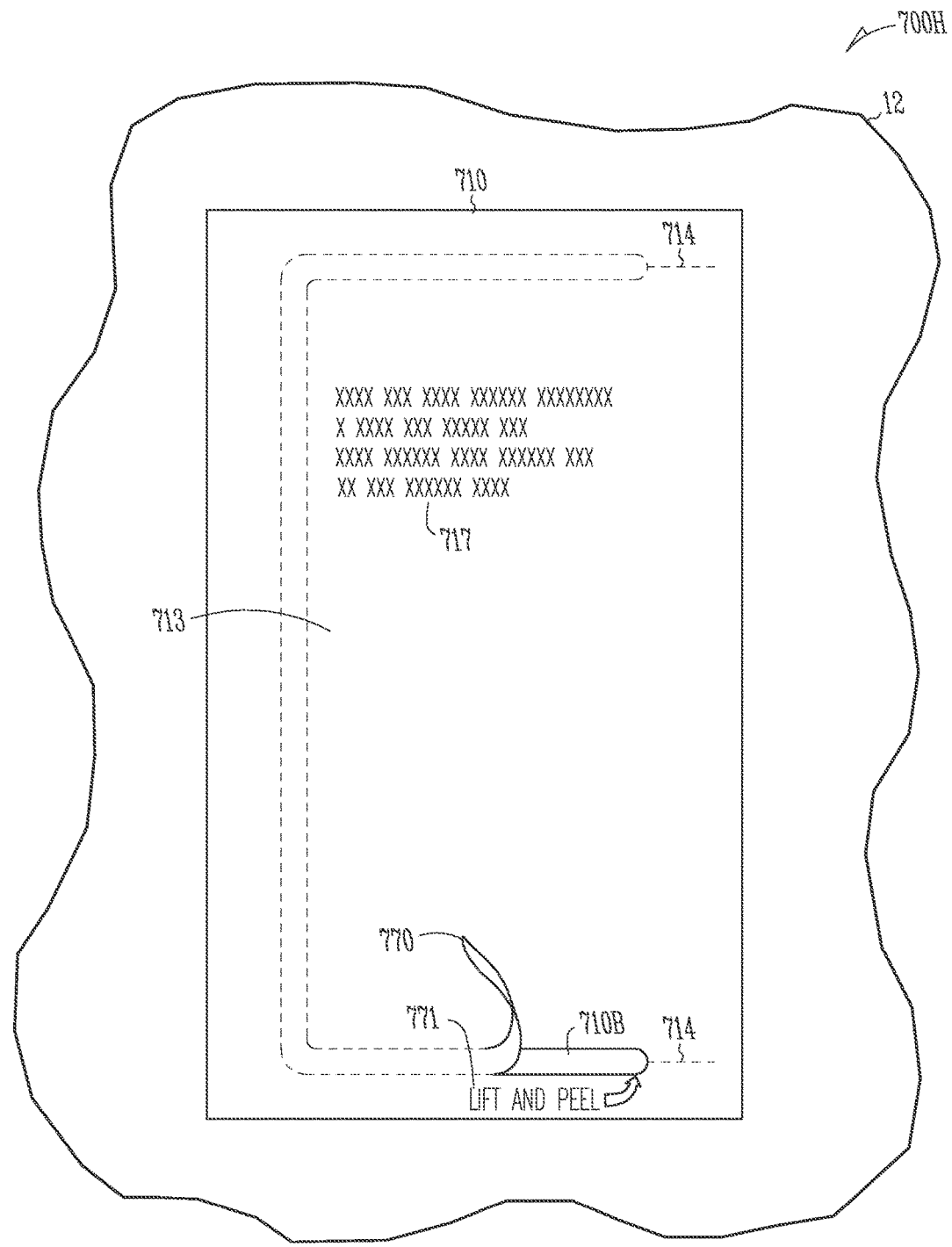
Figure 7J:
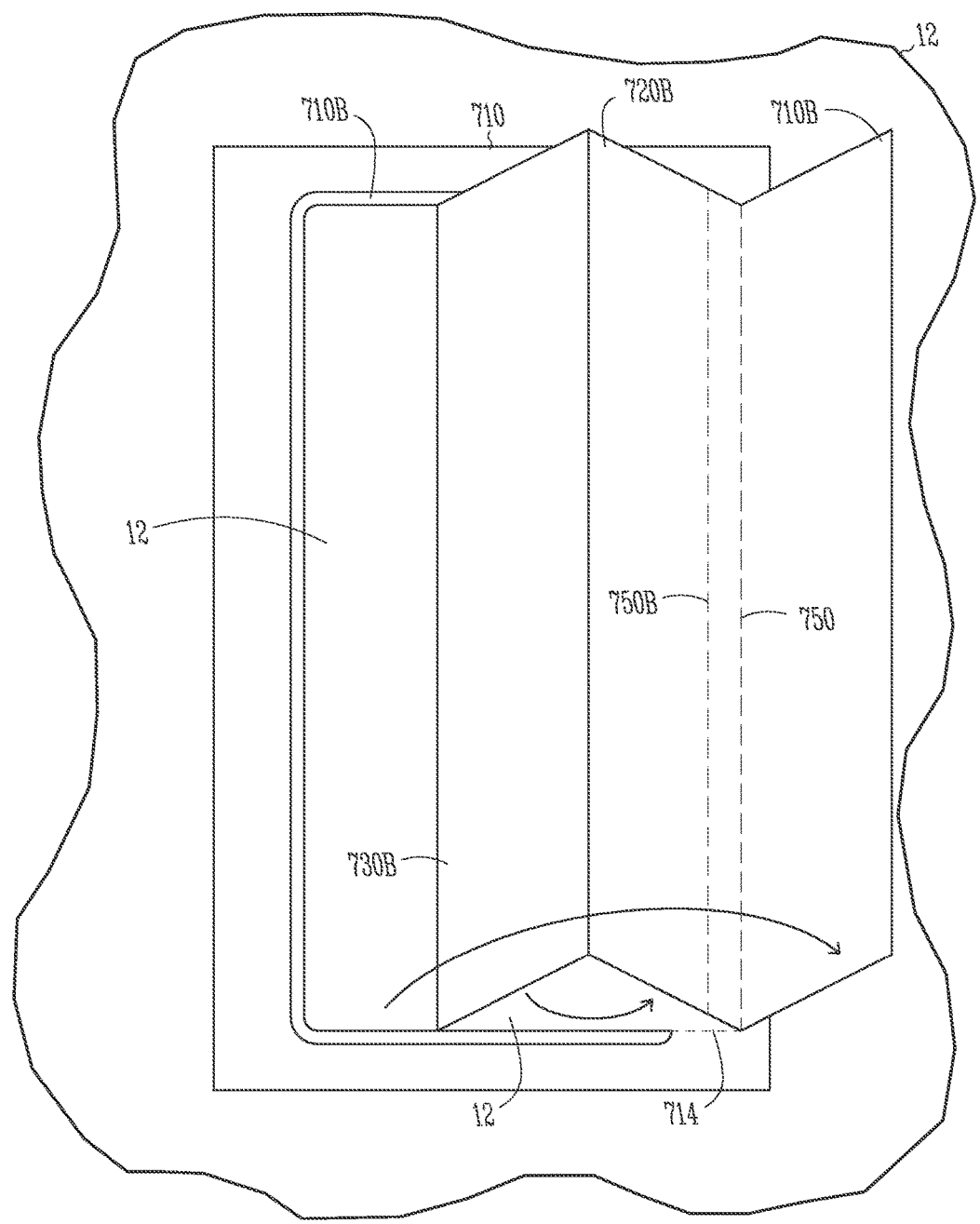
FIG. 7J is another top view of the multilayer label of FIG. 7H as applied to a letter, package, or container, according to various embodiments.

Referring now to FIGS. 7H, 7I, and 7J, other embodiments of a multi-layered label are disclosed. The embodiments of FIGS. 7H, 7I, and 7J include many of the same features of the embodiments of FIGS. 7A-7F, the details of which will not be repeated. Referring to FIG. 7H, a front side of a label 700H is illustrated. Specifically, the first panel 710 includes a pull strip 770. As can be seen from FIG. 7H, the pull strip 770 traverses the entire length of the longitudinal side of the sub-panel 713 that is distal from the second panel 720. The pull strip 770 also traverses a majority of the length of the top and bottom portions of the sub panel 713. The portion of the top and bottom of the sub-panel 713 that does not have the pull strip 770 includes a smaller segment of the perforated attachment-separation line 714. The first panel 710 further includes a message 771, conveying the instruction "LIFT AND PEEL", wherein a user of the label can begin the removal of the pull strip 770, the functionality of which is further described herein. It is noted that unlike the embodiment of FIG. 7A, the embodiment of FIG. 7H does not include the perforated attachment-separation line 714 on the side of the sub-panel 713 that is adjacent to the sub-panel 720.

Referring to the embodiments of FIGS. 7A-7F, when a person receives the letter, package, or container, the person can remove all three layers 701, 702, and 703 of the subpanel 713 along perforated attachment-separation line 714 by pulling on tab 718. The removal of subpanel 713 exposes the panels 720, 720B and/or 730, 730B (depending on whether the multilayer label was C-Folded or Z-Folded) within the compartment formed by the exposed adhesive layer 702 (via removal of strip 716 and panels 710BA) and the letter, package, or container.

Referring again to the embodiments of FIGS. 7H, 7I, and 7J, when a person receives the letter, package, or container, the person can remove the pull strip 770 by grasping the pull strip by the "LIFT AND PEEL" instruction, and removing the entire pull strip 770, as illustrated in FIG. 7I. Removing the pull strip 770 removes the top layer 701 and the adhesive layer 702 of the pull strip, leaving behind the bottom layer 703, and in particular, exposing a portion of the panel 710B as illustrated in FIG. 7I.

Since the pull strip 770 and the perforated attachment-separation line 714 do not traverse the side adjacent to the sub-panel 720, the sub-panel 713 is not easily removed from the label 700H, but rather simply pivots about an axis in the vicinity of and substantially parallel to perforated attachment-separation line 750B as illustrated in FIG. 7J. As further illustrated in FIG. 7J, when the sub-panel 713 pivots about the axis, it exposes the bottom 710B of the panel 710. As further illustrated in FIG. 7J, the pivoting of sub-panel 713 about the axis exposes the second panel 720 and the third panel 730. In the embodiment of FIG. 7J, the second panel 720 and the third panel 730 were Z-folded, so that the pivoting of the sub-panel 713 exposes the bottom 720B of the panel 720, and when panels 720 and 730 are pivoted in a manner similar to the sub-panel 713, the bottom portion 730B of the third panel 730 is exposed as is illustrated in FIG. 7J. At this point, the letter, package, or container 12 is also partially exposed. Further, panels 720 and 730 can be removed along the perforated attachment-separation line 750B, and one or both of the panels 720 and 730 can be used as a return label on another package or for some other purpose.

FIG. 7E illustrates a side view of an embodiment of the multilayer label 700, which contains top layer 701, middle layer 702, and bottom layer 703. The top layer 701 includes the panel 710, the subpanel 713, the pull tab 721, the panel 720, and the panel 730. As FIG. 7E illustrates, from the side view of FIG. 7E, the pull tab 721 overlaps a portion of the panel 720. In an embodiment, the entire middle layer 702 includes an adhesive. FIG. 7E illustrates the strip 715 so as to provide a perspective of the strip 715 from the side view of FIG. 7E. The bottom layer 703 includes the panel 710B, the panel 720B, the panel 730B, the strip 716, the pull tab 721, and the strip 710BA. As illustrated in FIG. 7E, strip 710BA extends along the entire lateral edge of the label and panel 710B, and also overlaps strip 716 and eventually becomes pull tab 721.

FIG. 7G illustrates a plurality of multilayer labels 700. In an embodiment, the labels are manufactured on a sheet by sheet (or label by label) basis, wherein each sheet is a separate entity (as compared to a roll wherein each sheet or label is attached to the end of another sheet or label). An advantage of this sheet by sheet manufacture is that the sheets can be delivered into a printer tray continuously without interruption while the printer is running. This results in no downtime in production flow. In contrast, labels manufactured as rolls have to be changed out frequently creating downtime in the production flow. Additionally, sheets can be run through high speed laser and ink jet printers allowing high resolution multicolor on demand and variable indicia onto both sides of the sheet on a single pass. In contrast, rolls are run through slow speed (4-6 inches per second) thermal printers that allow only one color (black) and on demand variable indicia only on one side of the roll. Additionally, sheets allow the person applying the label to not have to separate the label they are applying from the previous label on the roll or the next label on the roll. Sheets also allow for automatic application (via machinery) without labor costs and streamlining of the production flow while eliminating the chance for human error. Rolls of labels require a person to separate a label they are applying from a previous label and the next label on the roll. Rolls also prohibit any automating of folding or applying of a label.

Example Embodiments

Example No. 1 is a label that includes a first section and a second section. The second section is attached to the first section. The first section includes a panel, and the panel includes one or more sides that are detachable from the first section.

Example No. 2 includes the features of Example No. 1, and optionally includes a label wherein the second section is detachable from the first section.

Example No. 3 includes the features of Example Nos. 1-2, and optionally includes a label wherein the panel is substantially centered within an area of the first section, and wherein the panel and first section are configured such that three sides of the panel are detachable from the first section, while a fourth side of the panel remains attached to the first section, thereby permitting the panel to rotate or pivot about a line formed by the fourth side and the first section.

Example No. 4 includes the features of Examples Nos. 1-3, and optionally includes a label wherein the fourth side of the panel is detachable from the first section.

Example No. 5 includes the features of Examples Nos. 1-4, and optionally includes a label including an adhesive on an underside of the first section.

Example No. 6 includes the features of Examples Nos. 1-5, and optionally includes a label including an adhesive on an underside of the second section.

Example No. 7 includes the features of Examples Nos. 1-6, and optionally includes a label including a peelable covering over the adhesive on the underside of the first section and a peelable covering over the adhesive on the underside of the second section.

Example No. 8 includes the features of Examples Nos. 1-7, and optionally includes a label wherein the first section includes a subsection at a point of attachment between the first section and the second section such that upon rotating or pivoting the second section about the point of attachment, the second section separates from the first section and exposes an underside of the subsection, wherein the underside of the subsection comprises an adhesive.

Example No. 9 includes the features of Examples Nos. 1-8, and optionally includes a label wherein the first section and second section are configured such that upon rotating or pivoting the second section, the second section is positioned adjacent to the underside of the first section, and the sides of the panel are configured such that a removal of the panel from the first section exposes the second section.

Example No. 10 includes the features of Examples Nos. 1-9, and optionally includes a label wherein the first section includes a perimeter around the panel, such that when the second section is positioned adjacent the underside of the first section, the perimeter outlines the second section.

Example No. 11 includes the features of Examples Nos. 1-10, and optionally includes a label wherein the one or more sides of the panel are coupled to the first section via a perforated edge.

Example No. 12 includes the features of Examples Nos. 1-11, and optionally includes a label wherein the label is configured for attachment to a letter, package, or other parcel.

Example No. 13 includes the features of Examples Nos. 1-12, and optionally includes a label including a third section attached to the second section.

Example No. 14 includes the features of Examples Nos. 1-13, and optionally includes a label wherein one or more of the second section and the third section comprise one or more of a promotional message, a commercial message, an advertising message, a personal message, and a return mailing label.

Example No. 15 includes the features of Examples Nos. 1-14, and optionally includes a label wherein the third section is detachable from the second section on a side that is opposite the side at which the second section is attached to the first section.

Example No. 16 includes the features of Examples Nos. 1-15, and optionally includes a label wherein the second section is attached to the first section via a score line.

Example No. 17 includes the features of Examples Nos. 1-16, and optionally includes a label wherein the third section is attached to the second section via a fold line.

Example No. 18 includes the features of Examples Nos. 1-17, and optionally includes a label wherein the second section and the third section are configured such that upon rotating or pivoting the third section about the fold line, and upon rotating or pivoting the second section about the score line, the second section and the third section are positioned adjacent to the underside of the first section, and the sides of the panel are configured such that a removal of the panel from the first section exposes the second section and the third section, and wherein the first section comprises a perimeter around the panel such that when the second section and third section are positioned adjacent to the underside of the first section, the perimeter outlines the second section and the third section.

Example No. 19 includes the features of Examples Nos. 1-18, and optionally includes a label wherein upon positioning the second section and the third section adjacent to the underside of the first section, a subsection adjacent to the score line is exposed, the subsection comprising an adhesive on an underside of the subsection.

Example No. 20 includes the features of Examples Nos. 1-19, and optionally includes a label including a perimeter around the first section, the perimeter comprising an adhesive on an underside of the perimeter.

Example No. 21 includes the features of Examples Nos. 1-20, and optionally includes a label wherein the first section comprises one or more of addressor information, addressee information, shipper information, and a computer readable code such as a one or two dimensional bar code.

Example No. 22 is a label that includes a first section, and a second section that is detachably coupled to the first section. The first section includes a panel, and the panel includes one or more sides that are detachable from the first section. The panel is substantially centered within an area of the first section. The first section includes a subsection at a point of attachment between the first section and the second section such that upon rotating or pivoting the second section about the point of attachment, the second section separates from the first section and exposes an underside of the subsection. The underside of the subsection comprises an adhesive. The first section and second section are configured such that upon rotating or pivoting the second section, the second section is positioned adjacent to the underside of the first section, and the sides of the panel are configured such that a removal of the panel from the first section exposes the second section.

Example No. 23 includes the features of Examples No. 22, and optionally includes a label including an adhesive on an underside of the first section and an adhesive on an underside of the second section.

Example No. 24 includes the features of Examples Nos. 22-23, and optionally includes a label including a third section attached to the second section.

Example No. 25 includes the features of Examples Nos. 22-24, and optionally includes a label wherein the third section is detachable from the second section on a side that is opposite the side at which the second section is attached to the first section.

Example No. 26 includes the features of Examples Nos. 22-25, and optionally includes a label wherein the second section is attached to the first section via a score line.

Example No. 27 includes the features of Examples Nos. 22-26, and optionally includes a label wherein the third section is attached to the second section via a fold line.

Example No. 28 includes the features of Examples Nos. 22-27, and optionally includes a label wherein the second section and the third section are configured such that upon rotating or pivoting the third section about the fold line, and upon rotating or pivoting the second section about the score line, the second section and the third section are positioned adjacent to an underside of the first section. The sides of the panel are configured such that a removal of the panel from the first section exposes the second section and the third section. The first section includes a perimeter around the panel such that when the second section and third section are positioned adjacent to the underside of the first section, the perimeter outlines the second section and the third section.

Example No. 29 is a label that includes a first section and a second section. The second section is attached to the first section. The first section includes a panel, and the panel includes one or more sides that are detachable from the first section.

Example No. 30 is a multilayer label that includes a top first panel; a bottom first panel positioned under the top first panel; a top second panel adjacent to the top first panel; a bottom second panel positioned under the top second panel, the bottom second panel adjacent to the bottom first panel; a top third panel adjacent to the top second panel, the top second panel positioned between the top first panel and the top third panel; a bottom third panel positioned under the top third panel, the bottom third panel adjacent to the bottom second panel, the bottom second panel positioned between the bottom first panel and the bottom third panel; an adhesive layer positioned between each of the top first panel and the bottom first panel, the top second panel and the bottom second panel, and the top third panel and the bottom third panel; and a subpanel positioned in the top first panel, the subpanel defined by a removable strip, the removable strip positioned adjacent to three sides of the top first panel, the three sides not including a side adjacent to the top second panel; and the subpanel defined by a first perforated attachment-separation line, the first perforated attachment-separation line positioned between an end of the removable strip and the top second panel; wherein the top first panel and the adhesive layer comprise a first strip, the first strip abutting the top second panel and extending along a side of the top second panel; wherein the bottom second panel comprises a second strip, the second strip comprising a peelable covering of the first strip; wherein the top second panel and the bottom second panel are coupled to the top third panel and the bottom third panel via a second perforated attachment-separation line; wherein the bottom first panel comprises a contiguous removable strip on three sides of the bottom first panel, the three sides of the bottom first panel not including a side of the bottom first panel that is adjacent to the bottom second panel; wherein the second perforated attachment-separation line permits the top third panel to be folded onto the top second panel, or the second perforated attachment-separation line permits the bottom third panel to be folded onto the bottom second panel; and comprising a first separation line between the top first panel and the top second panel; and comprising a second separation line between the bottom first panel and the bottom second panel; wherein the first separation line permits the top second panel, the bottom second panel, the top third panel, and the bottom third panel to be folded onto the bottom first panel, thereby causing the second strip to be pulled away from the first strip, thereby exposing the adhesive layer of the first strip; and wherein the contiguous removable strip exposes the adhesive layer upon removal of the contiguous removable strip, such that upon application of the multilayer label to a substrate, the multilayer label is adhesively adhered to the substrate only by the first strip and the adhesive layer exposed by a removal of the contiguous removable strip.

Example No. 31 includes the features of Example No. 30, and optionally includes a feature wherein the subpanel comprises approximately 90% of the top first panel.

Example No. 32 includes the features of Example Nos. 30-31, and optionally includes a feature wherein the removable strip is configured such that upon removal of the removable strip, a portion of the bottom first bottom panel is exposed, and upon removal of the removable strip the top first panel and bottom first panel are capable of pivoting about an axis adjacent to the side that is adjacent to the top second panel, thereby exposing the top second panel, the bottom second panel, the top third panel, and the bottom third panel.

Example No. 33 includes the features of Example Nos. 30-32, and optionally includes a feature wherein upon the pivoting of the top first panel and the bottom first panel about the axis adjacent to the side that is adjacent to the top second panel, the first perforated separation-attachment line is torn, thereby permitting a further pivoting of the top first panel and the bottom first panel.

Example No. 34 includes the features of Example Nos. 30-33, and optionally includes a feature wherein upon the pivoting and the further pivoting of the top first panel and the bottom first panel, and the exposing of the top second panel, the bottom second panel, the top third panel, and the bottom third panel, the second separation line between the bottom first panel and the bottom second panel is exposed, and the top second panel, the bottom second panel, the top third panel, and the bottom third panel are removable from the top first panel and the bottom first panel via the second separation line between the bottom first panel and the bottom second panel.

Example No. 35 includes the features of Example Nos. 30-34, and optionally includes a feature wherein the second perforated attachment-separation line permits a separation of the top second panel and the bottom second panel from the top third panel and the bottom third panel.

Example No. 36 includes the features of Example Nos. 30-35, and optionally includes a feature wherein the subpanel is positioned in an approximate center of the top first panel.

Example No. 37 includes the features of Example Nos. 30-36, and optionally includes the substrate to which the multilayer label is adhered.

Example No. 38 includes the features of Example Nos. 30-37, and optionally includes a feature wherein the substrate comprises a letter, package, or container.

Example No. 39 includes the features of Example Nos. 30-38, and optionally includes a tab; the tab comprising a top first layer, an adhesive second layer, and a bottom third layer; the adhesive second layer of the tab positioned between the top first layer of the tab and the bottom third layer of the tab; the top first layer positioned adjacent to the top first panel and the top second panel; the tab coupled to the top first panel via a second separation line; and the bottom third layer comprising an extension of the contiguous removable strip of the bottom first panel.

Example No. 40 is a multilayer label including a top first panel; a bottom first panel positioned under the top first panel; a top second panel adjacent to the top first panel; a bottom second panel positioned under the top second panel, the bottom second panel adjacent to the bottom first panel; a top third panel adjacent to the top second panel, the top second panel positioned between the top first panel and the top third panel; a bottom third panel positioned under the top third panel, the bottom third panel adjacent to the bottom second panel, the bottom second panel positioned between the bottom first panel and the bottom third panel; an adhesive layer positioned between each of the top first panel and the bottom first panel, the top second panel and the bottom second panel, and the top third panel and the bottom third panel; and a subpanel positioned in the top first panel, the subpanel defined by a removable strip, the removable strip positioned adjacent to three sides of the top first panel, the three sides not including a side adjacent to the top second panel; and the subpanel defined by a first perforated attachment-separation line, the first perforated attachment-separation line positioned between an end of the removable strip and the top second panel; wherein the top first panel and the adhesive layer comprise a first strip, the first strip abutting the top second panel and extending along a side of the top second panel; wherein the bottom second panel comprises a second strip, the second strip comprising a peelable covering of the first strip; wherein the top second panel and the bottom second panel are coupled to the top third panel and the bottom third panel via a second perforated attachment-separation line; wherein the bottom first panel comprises a contiguous removable strip on three sides of the bottom first panel, the three sides of the bottom first panel not including a side of the bottom first panel that is adjacent to the bottom second panel; wherein the second perforated attachment-separation line permits the top third panel to be folded onto the top second panel, or the second perforated attachment-separation line permits the bottom third panel to be folded onto the bottom second panel; and comprising a first separation line between the top first panel and the top second panel; and comprising a second separation line between the bottom first panel and the bottom second panel; wherein the first separation line permits the top second panel, the bottom second panel, the top third panel, and the bottom third panel to be folded onto the bottom first panel, thereby causing the second strip to be pulled away from the first strip, thereby exposing the adhesive layer of the first strip; and wherein the contiguous removable strip exposes the adhesive layer upon removal of the contiguous removable strip, such that upon application of the multilayer label to a substrate, the multilayer label is not adhesively adhered to the substrate via the adhesive layer positioned between the top third panel and the bottom third panel.

Example No. 41 is a multilayer label including a top first panel; a bottom first panel positioned under the top first panel; a top second panel adjacent to the top first panel; a bottom second panel positioned under the top second panel, the bottom second panel adjacent to the bottom first panel; a top third panel adjacent to the top second panel, the top second panel positioned between the top first panel and the top third panel; a bottom third panel positioned under the top third panel, the bottom third panel adjacent to the bottom second panel, the bottom second panel positioned between the bottom first panel and the bottom third panel; an adhesive layer positioned between each of the top first panel and the bottom first panel, the top second panel and the bottom second panel, and the top third panel and the bottom third panel; and a removable strip positioned in the top first panel, the removable strip defining a subpanel on the top first panel, the removable strip positioned adjacent to three sides of the top first panel, the three sides not including a side adjacent to the top second panel; the subpanel further defined by a first perforated attachment-separation line, the first perforated attachment-separation line positioned between an end of the removable strip and the second top panel; wherein the top first panel and the adhesive layer comprise a first strip, the first strip abutting the top second panel and extending along a side of the top second panel; wherein the bottom second panel comprises a second strip, the second strip comprising a peelable covering of the first strip; wherein the top second panel and the bottom second panel are coupled to the top third panel and the bottom third panel via a second perforated attachment-separation line; wherein the bottom first panel comprises a contiguous removable strip on three sides of the bottom first panel, the three sides of the bottom first panel not including a side of the bottom first panel that is adjacent to the bottom second panel; wherein the second perforated attachment-separation line permits the top third panel to be folded onto the top second panel, or the second perforated attachment-separation line permits the bottom third panel to be folded onto the bottom second panel; and comprising a first separation line between the top first panel and the top second panel; and comprising a second separation line between the bottom first panel and the bottom second panel; wherein the first separation line permits the top second panel, the bottom second panel, the top third panel, and the bottom third panel to be folded onto the bottom first panel, thereby causing the second strip to be pulled away from the first strip, thereby exposing the adhesive layer of the first strip; and wherein the contiguous removable strip exposes the adhesive layer upon removal of the contiguous removable strip, such that upon application of the multilayer label to a substrate, the multilayer label is adhesively adhered to the substrate only by the first strip and the adhesive layer exposed by a removal of the contiguous removable strip.

Example No. 42 includes the features of Example No. 41, and optionally includes a feature wherein the top first panel, the bottom first panel, the top second panel, the bottom second panel, the top third panel, and the bottom third panel comprise a square or a rectangle.

Example No. 43 is a multilayer label including a top first panel; a bottom first panel positioned under the top first panel; a top second panel adjacent to the top first panel; a bottom second panel positioned under the top second panel, the bottom second panel adjacent to the bottom first panel; an adhesive layer positioned between each of the top first panel and the bottom first panel and the top second panel and the bottom second panel; and a subpanel positioned in the top panel, the subpanel defined by a removable strip, the removable strip positioned adjacent to three sides of the top panel, the three sides not adjacent to the top second panel; and the subpanel further defined by a perforated attachment-separation line, the perforated attachment-separation line positioned at an end of the removable strip adjacent the top second panel; wherein the top first panel and the adhesive layer comprise a first strip, the first strip abutting the top second panel and extending along a side of the top second panel; wherein the bottom second panel comprises a second strip, the second strip comprising a peelable covering of the first strip; wherein the bottom first panel comprises a contiguous removable strip on three sides of the bottom first panel, the three sides of the bottom first panel not including a side of the bottom first panel that is adjacent to the bottom second panel; and comprising a first separation line between the top first panel and the top second panel; and comprising a second separation line between the bottom first panel and the bottom second panel; wherein the first separation line permits the top second panel and the bottom second panel to be folded onto the bottom first panel, thereby causing the second strip to be pulled away from the first strip, thereby exposing the adhesive layer of the first strip; and wherein the contiguous removable strip exposes the adhesive layer upon removal of the contiguous removable strip, such that upon application of the multilayer label to a substrate, the multilayer label is adhesively adhered to the substrate only by the first strip and the adhesive layer exposed by a removal of the contiguous removable strip.

Example No. 44 includes the features of Example No. 43, and optionally includes a feature wherein the multiple layer label comprises a square or a rectangle.

Example No. 45 is a multilayer label including a top first panel; a bottom first panel positioned under the top first panel; a top second panel adjacent to the top first panel; a bottom second panel positioned under the top second panel, the bottom second panel adjacent to the bottom first panel; an adhesive layer positioned between each of the top first panel and the bottom first panel and the top second panel and the bottom second panel; and a subpanel positioned in the top first panel, the subpanel defined by a first perforated attachment-separation line; wherein the top first panel and the adhesive layer comprise a first strip, the first strip abutting the top second panel and extending along a side of the top second panel; wherein the bottom second panel comprises a second strip, the second strip comprising a peelable covering of the first strip; wherein the bottom first panel comprises a contiguous removable strip on three sides of the bottom first panel, the three sides of the bottom first panel not including a side of the bottom first panel that is adjacent to the bottom second panel; and comprising a first separation line between the top first panel and the top second panel; and comprising a second separation line between the bottom first panel and the bottom second panel; wherein the first separation line permits the top second panel and the bottom second panel to be folded onto the bottom first panel, thereby causing the second strip to be pulled away from the first strip, thereby exposing the adhesive layer of the first strip; and wherein the contiguous removable strip exposes the adhesive layer upon removal of the contiguous removable strip, such that upon application of the multilayer label to a substrate, the multilayer label is adhesively adhered to the substrate only by the first strip and the adhesive layer exposed by a removal of the contiguous removable strip.

While the various embodiments have been illustrated and described, as noted above, this Detailed Description is not to be taken in a limiting sense. Instead, this disclosure is intended to cover adaptations or variations of the various embodiments. Combinations of the various embodiments, and other embodiments not specifically described herein, will be apparent to those of ordinary skill in the art upon reviewing the above description.

The invention claimed is:

1. A multilayer label comprising:
a top first panel;
a bottom first panel positioned under the top first panel;
a top second panel adjacent to the top first panel;
a bottom second panel positioned under the top second panel, the bottom second panel adjacent to the bottom first panel;
an adhesive layer positioned between the top first panel, the bottom first panel, the top second panel, and the bottom second panel; and
a subpanel positioned in the top first panel, the subpanel defined by a removable strip, the removable strip positioned adjacent to three sides of the top first panel, the three sides not including a side adjacent to the top second panel; and the subpanel defined by a first perforated attachment-separation line, the first perforated attachment-separation line positioned between an end of the removable strip and the top second panel;
wherein the top first panel and the adhesive layer comprise a first strip, the first strip abutting the top second panel and extending along a side of the top second panel;
wherein the bottom second panel comprises a second strip, the second strip comprising a peelable covering of the first strip;
wherein the bottom first panel comprises a contiguous removable strip on three sides of the bottom first panel, the three sides of the bottom first panel not including a side of the bottom first panel that is adjacent to the bottom second panel; and
comprising a first separation line between the top first panel and the top second panel; and
comprising a second separation line between the bottom first panel and the bottom second panel;
wherein the first separation line permits the top second panel and the bottom second panel to be folded onto the bottom first panel, thereby causing the second strip to be pulled away from the first strip, thereby exposing the adhesive layer of the first strip;
wherein the contiguous removable strip exposes the adhesive layer upon removal of the contiguous removable strip, such that upon application of the multilayer label to a substrate, the multilayer label is adhesively adhered to the substrate only by the first strip and the adhesive layer exposed by a removal of the contiguous removable strip; and
wherein the subpanel comprises approximately 90% of the top first panel.

2. The multilayer label of claim 1, wherein the removable strip is configured such that upon removal of the removable strip, a portion of the bottom first bottom panel is exposed, and upon removal of the removable strip the top first panel and bottom first panel are capable of pivoting about an axis adjacent to the side that is adjacent to the top second panel, thereby exposing the top second panel and the bottom second panel.

3. The multilayer label of claim 2, wherein upon the pivoting of the top first panel and the bottom first panel about the axis adjacent to the side that is adjacent to the top second panel, the first perforated separation-attachment line is torn, thereby permitting a further pivoting of the top first panel and the bottom first panel.

4. The multi-layer label of claim 3, wherein upon the pivoting and the further pivoting of the top first panel and the bottom first panel, and the exposing of the top second panel and the bottom second panel, the second separation line between the bottom first panel and the bottom second panel is exposed, and the top second panel and the bottom second panel are removable from the top first panel and the bottom first panel via the second separation line between the bottom first panel and the bottom second panel.

5. The multilayer label of claim 1, wherein the subpanel is positioned in an approximate center of the top first panel.

6. The multilayer label of claim 1, comprising the substrate to which the multilayer label is adhered.

7. The multilayer label of claim 6, wherein the substrate comprises a letter, package, or container.

8. The multilayer label of claim 1, comprising a tab; the tab comprising a top first layer, an adhesive second layer, and a bottom third layer; the adhesive second layer of the tab positioned between the top first layer of the tab and the bottom third layer of the tab; the top first layer positioned adjacent to the top first panel and the top second panel; the tab coupled to the top first panel via a second separation line; and the bottom third layer comprising an extension of the contiguous removable strip of the bottom first panel.

9. A multilayer label comprising:
a top first panel;
a bottom first panel positioned under the top first panel;
a top second panel adjacent to the top first panel;
a bottom second panel positioned under the top second panel, the bottom second panel adjacent to the bottom first panel;
an adhesive layer positioned between the top first panel, the bottom first panel, the top second panel, and the bottom second panel; and
a subpanel positioned in the top first panel, the subpanel defined by a removable strip, the removable strip positioned adjacent to three sides of the top first panel, the three sides not including a side adjacent to the top second panel; and the subpanel defined by a first perforated attachment-separation line, the first perforated attachment-separation line positioned between an end of the removable strip and the top second panel;
wherein the top first panel and the adhesive layer comprise a first strip, the first strip abutting the top second panel and extending along a side of the top second panel;
wherein the bottom second panel comprises a second strip, the second strip comprising a peelable covering of the first strip;
wherein the bottom first panel comprises a contiguous removable strip on three sides of the bottom first panel, the three sides of the bottom first panel not including a side of the bottom first panel that is adjacent to the bottom second panel; and
comprising a first separation line between the top first panel and the top second panel; and
comprising a second separation line between the bottom first panel and the bottom second panel;
wherein the first separation line permits the top second panel and the bottom second panel to be folded onto the bottom first panel, thereby causing the second strip to be pulled away from the first strip, thereby exposing the adhesive layer of the first strip; and
wherein the contiguous removable strip exposes the adhesive layer upon removal of the contiguous removable strip, such that upon application of the multilayer label to a substrate, the multilayer label is not adhesively adhered to the substrate via the adhesive layer positioned between the top second panel and the bottom second panel.

10. A multilayer label comprising:
a top first panel;
a bottom first panel positioned under the top first panel;
a top second panel adjacent to the top first panel;
a bottom second panel positioned under the top second panel, the bottom second panel adjacent to the bottom first panel;
an adhesive layer positioned between the top first panel, the bottom first panel, the top second panel, and the bottom second panel; and
a subpanel positioned in the top first panel, the subpanel defined by a first perforated attachment-separation line;
wherein the top first panel and the adhesive layer comprise a first strip, the first strip abutting the top second panel and extending along a side of the top second panel;
wherein the bottom second panel comprises a second strip, the second strip comprising a peelable covering of the first strip;
wherein the bottom first panel comprises a contiguous removable strip on three sides of the bottom first panel, the three sides of the bottom first panel not including a side of the bottom first panel that is adjacent to the bottom second panel; and
comprising a separation line between the top first panel and the top second panel;
wherein the separation line permits the top second panel and the bottom second panel to be folded onto the bottom first panel, thereby causing the second strip to be pulled away from the first strip, thereby exposing the adhesive layer of the first strip; and
wherein the contiguous removable strip exposes the adhesive layer upon removal of the contiguous removable strip, such that upon application of the multilayer label to a substrate, the multilayer label is adhesively adhered to the substrate only by the first strip and the adhesive layer exposed by a removal of the contiguous removable strip.

11. The multilayer label of claim 10, comprising an opening penetrating the top first panel, the bottom first panel, and the adhesive layer, the opening positioned at a corner of the subpanel.

12. The multilayer label of claim 11, wherein the opening includes a tab for removal of the subpanel from the top first panel.

13. The multilayer label of claim 10, wherein the subpanel comprises approximately 90% of the top first panel.

14. The multilayer label of claim 10, wherein the first perforated attachment-separation line is tearable so as to permit the removal of the subpanel from the top first panel.

15. The multilayer label of claim 10, wherein the subpanel is positioned in an approximate center of the top first panel.

16. The multilayer label of claim 10, further comprising a letter, package, or container to which the multilayer label is adhered.

17. The multilayer label of claim 10, comprising a second tab; the second tab comprising a first layer, an adhesive second layer, and a third layer; the adhesive second layer positioned between the first layer and the third layer; the first layer positioned adjacent to the first top panel and the second top panel; the second tab coupled to the first top panel via a second separation line; and the third layer comprising an extension of the contiguous removable strip of the bottom first panel.

18. The multilayer label of claim 10, wherein the first perforated attachment-separation line is offset from each edge of the top first panel such that the first perforated attachment-separation line adjacent to the top second panel is separated from the top second panel and does not contact the top second panel.

19. A multilayer label comprising:
a top first panel;
a bottom first panel positioned under the top first panel;
a top second panel adjacent to the top first panel;
a bottom second panel positioned under the top second panel, the bottom second panel adjacent to the bottom first panel;
an adhesive layer positioned between the top first panel, the bottom first panel, the top second panel, and the bottom second panel; and
a subpanel positioned in the top first panel, the subpanel defined by a first perforated attachment-separation line;

wherein the top first panel and the adhesive layer comprise a first strip, the first strip abutting the top second panel and extending along a side of the top second panel;
wherein the bottom second panel comprises a second strip, the second strip comprising a peelable covering of the first strip;
wherein the bottom first panel comprises a contiguous removable strip on three sides of the bottom first panel; and
comprising a separation line between the top first panel and the top second panel;
wherein the separation line permits the top second panel and the bottom second panel to be folded onto the bottom first panel, thereby causing the second strip to be pulled away from the first strip, thereby exposing the adhesive layer of the first strip; and
wherein the contiguous removable strip exposes the adhesive layer upon removal of the contiguous removable strip, such that upon application of the multilayer label to a substrate, the multilayer label is not adhesively adhered to the substrate via the adhesive layer positioned between the top second panel and the bottom second panel.

\* \* \* \* \*

UNITED STATES PATENT AND TRADEMARK OFFICE
CERTIFICATE OF CORRECTION

PATENT NO. : 10,339,839 B2
APPLICATION NO. : 15/934108
DATED : July 2, 2019
INVENTOR(S) : Shanley et al.

It is certified that error appears in the above-identified patent and that said Letters Patent is hereby corrected as shown below:

In the Specification

Column 3, Lines 63-64, delete "separation-attachment" and insert --attachment-separation-- therefor Column 3, Line 65, delete "separation-attachment" and insert --attachment-separation-- therefor Column 5, Line 8, delete "720, 720" and insert --720, 720B-- therefor Column 10, Line 51, delete "separation-attachment" and insert --attachment-separation-- therefor In the Claims Column 15, Line 7, Claim 3, delete "separation-attachment" and insert --attachment-separation-- therefor Column 15, Line 25, Claim 8, after "comprising", insert --:¶--

Column 15, Line 25, Claim 8, after "tab;", insert --¶--

Column 15, Line 27, Claim 8, after "layer;", insert --¶--

Column 15, Line 29, Claim 8, after "tab;", insert --¶--

Column 15, Line 30, Claim 8, after "panel;", insert --¶--

Column 15, Line 32, Claim 8, after "and", insert --¶--

Column 17, Line 1, Claim 17, after "comprising", insert --:¶--

Column 17, Line 2, Claim 17, after "tab;", insert --¶--

Signed and Sealed this
Twenty-first Day of April, 2020

Andrei Iancu
*Director of the United States Patent and Trademark Office*

Column 17, Line 3, Claim 17, after "layer;", insert --¶--

Column 17, Line 4, Claim 17, after "layer;", insert --¶--

Column 17, Line 6, Claim 17, after "panel;", insert --¶--

Column 17, Line 7, Claim 17, after "and", insert --¶--